United States Patent [19]
Wirtz

[11] Patent Number: 5,611,371
[45] Date of Patent: Mar. 18, 1997

[54] SHIFT/REGULATING VALVE FOR CONTROLLING AN HYDRODYNAMIC TORQUE CONVERTER FOR AN AUTOMATIC TRANSMISSION

[75] Inventor: Hans-Peter Wirtz, Cologne, Germany

[73] Assignee: Ford Motor Company, Dearborn, Mich.

[21] Appl. No.: 629,156

[22] Filed: Apr. 8, 1996

[51] Int. Cl.[6] .................................................. F15B 13/043
[52] U.S. Cl. ........................................ 137/625.64; 192/3.3
[58] Field of Search ........................ 137/625.64; 192/3.3

[56] References Cited

U.S. PATENT DOCUMENTS 5,058,716  10/1991  Lippe et al. ..................... 192/3.3 X

FOREIGN PATENT DOCUMENTS

| | | |
|---|---|---|
| 0419782A1 | 4/1991 | European Pat. Off. . |
| 0433619A2 | 6/1991 | European Pat. Off. . |
| 3818102A1 | 12/1988 | Germany . |
| 3928048C2 | 2/1992 | Germany . |
| 3130871C3 | 5/1994 | Germany . |

OTHER PUBLICATIONS

"Kraftfahrzeugtechnik", Westermann-Verlag, 2nd Ed., 349–351, Gerigk et al.
ATZ Automobiltechnische Zeitschrift 88 (1986), 81–87, Gimmler.

*Primary Examiner*—Gerald A. Michalsky
*Attorney, Agent, or Firm*—Frank G. McKenzie

[57] ABSTRACT

The invention relates to a shift/regulating valve for controlling hydrodynamic torque converters of automatic transmissions, comprising: a shifting component (11); and a valve body (12), which has: an end (13) facing the shifting component; an end (14) remote from the shifting component; a control pressure chamber (15) for a fluid medium; a guide bore extending from the control pressure chamber (15) to the end (13) remote from the shifting component; a control plunger (24) disposed in the guide bore and having at least one control groove (25a, 25b, 25c, 25d); a control pressure outlet (28) for the fluid medium from the control pressure chamber (15); a first pressure connection (29) to the control pressure chamber (15) for the fluid medium; at least one second pressure connection (30, 33, 36) connecting at least one working chamber (17, 18, 19, 20) with at least one outlet (31, 32, 34, 35); and at least one resilient element (26) at the end of the control plunger (24) remote from the shift; wherein at least one second pressure connection (30, 33, 36) can be connected to at least one outlet (31, 32, 34, 35) through the at least one control groove (25a, 25b, 25c, 25d) on the control plunger (24); said shift/regulating valve having: a control member (22) located in the control pressure chamber (15), of which the thinner end, remote from the shifting component, projects into the guide bore of the valve body (12), with a longitudinal bore (23) in the control member connecting the control pressure chamber (15) to a regulating pressure chamber (16) formed by the control plunger (24) and the control member (22); and a pressure connection (27) terminating in the end of the control pressure chamber (15) remote from the shifting component.

8 Claims, 5 Drawing Sheets

SHIFT/REGULATING VALVE FOR CONTROLLING AN HYDRODYNAMIC TORQUE CONVERTER FOR AN AUTOMATIC TRANSMISSION

BACKGROUND OF THE INVENTION

1. Field of the Invention

This invention relates to the field of hydrodynamic torque converters for automatic transmissions.

2. Description of the Prior Art

Automatic transmissions of motor vehicles are generally equipped with hydrodynamic torque converters such as are described, for example, in EP-A-0 433 619 or EP-A-0 419 782, or in general terms in Gerick, Bruhn, Danner "Kraftfahrzeugtechnik", Westerman-Verlag, 2nd edition, 1993, pages 349 to 351, the disclosures of which are incorporated herein by reference in their entirety in order to avoid repetition. Hydrodynamic torque converters facilitate soft, smooth starting of a motor vehicle at low engine speeds and gentle shifting of the automatic transmission. Use of these converters leads to a low-noise, low-wear, and infinitely variable transfer of the engine torque to the transmission.

Hydrodynamic torque converters include an impeller connected to the drive shaft, a stator carried on a free-wheel and a turbine connected to the shaft leading into the transmission. The housing of the torque converter, in which the above-mentioned components are arranged, is completely filled by way of a system of passages with a pressure fluid, which in the case of motor vehicles is usually hydraulic transmission fluid. The pressure in the hydrodynamic torque converter is regulated by control valves. The invention will be described below with reference to hydraulic transmission fluid, but is in no way limited to the use of hydraulic transmission fluid as pressure medium.

At low input speeds, the impeller transfers part of the kinetic energy to the hydraulic transmission fluid, which causes the turbine to rotate. By means of the stator, the flow of hydraulic transmission fluid is deflected so as to reinforce the action of the impeller. This shift state of the torque converter is called the "unlock position".

At high speeds, a coupling unit disposed between the impeller connected to the drive and the turbine, the so-called converter lockup clutch; connects the impeller to the turbine nonpositively (so-called "lockup position"), in order to minimize the loss of torque that results as the torque is transferred by means of the rotating stream of oil.

However, due to the nonpositive transfer of the torque in the lockup position, erratic behavior of the drive is transferred directly to the transmission through the lockup clutch, so that the driving behavior of the vehicle is adversely affected.

In order to ensure smooth transfer of the torque in the converter, even in the lockup position, the slip between impeller and turbine can be varied. By means of a control device, comprising a plurality of control valves, the pressure of the hydraulic transmission fluid inside the torque converter is varied, so that the coupling device is opened for a short time. The clutch then slips, i.e., the slip between the impeller and the turbine increases, and sudden, short-time changes in torque due to erratic behavior of the drive can be compensated.

To control the coupling device, the hydrodynamic torque converter is provided with two inlets, controlled by means of a control valve, which are supplied with pressurized hydraulic transmission fluid irrespective of the shift state of the clutch. The first of the two inlets is situated directly on the converter housing, while the second inlet communicates with a space inside the coupling device.

At low speeds of rotation of the turbine, a low pressure is applied to the first inlet of the coupling device, while the second inlet is exposed to a significantly higher pressure. The pressure difference between the inlets leads to separation occurring in the coupling device, which is thereby disengaged. The hydraulic transmission fluid, flowing through the second inlet into the coupling device, flows through the coupling device into the converter housing, and from there, by way of the first inlet, into the control hydraulics circuit (unlock position).

If the point of shift between the unlock and the lockup positions is reached, the first inlet is exposed to a significantly higher pressure than the second inlet. The pressure, now acting in the converter housing, forces the coupling device together, against the pressure acting in the coupling device, so that the impeller is connected nonpositively to the turbine (lockup position).

Throttle bores in the coupling device, or radial channels formed directly in the friction lining of the clutch plates, enable the hydraulic transmission fluid in the converter housing to flow into the space inside the coupling device. The hydraulic transmission fluid can thereby flow onward from the first inlet of the converter by way of the converter housing into the coupling device and thence into the second inlet so that the hydraulic transmission fluid circuit remains closed.

As mentioned above, in order to be able to regulate slip between the impeller and the turbine purposefully, the pressure acting at the first inlet of the converter is varied by means of the control device. This leads to incomplete closure of the coupling device and consequently to partial slippage of the clutch plates.

Since, through the continued movement the hydraulic transmission, fluid is subjected to flexing work and heats up, it must be constantly cooled by means of a cooling system, which is usually located outside the converter. The branching off of hydraulic transmission fluid is described in detail in Automobiltechnische Zeitschrift, 88 (1986), 81–87. The control of the flow of the hydraulic transmission fluid, which in hydrodynamic torque converters serves to drive the turbines and impellers as well as to shift the clutches integrated in the torque converters, takes place, as stated above, through control devices which simultaneously perform several functions.

Thus, for example, DE-A-38 18 102 discloses a control device comprising a lockup clutch control valve having a control plungers a magnetic valve, an oil pump, a control system, and a lubricating device. To operate the lockup clutch, the hydraulic transmission fluid conveyed by the oil pump is supplied by the lockup clutch control valve either to the engaging or to the disengaging chamber of the lockup clutch, according to the shift state of the converter. The position of the control plunger controlling the flow of oil to the lockup clutch is regulated by means of the magnetic valve, which changes a second oil pressure that is independent of the first oil circuit and acts on the end of the control plunger.

While the supply of the lockup clutch with hydraulic transmission fluid takes place through the oil pump, the lockup clutch control valve is controlled by means of a second, independent oil circuit. Apart from additional hydraulic components, such as a further oil pump, a magnetic valve, or further lines, a complicated electronic control system is needed which adapts the various oil circuits to one another.

A further control unit for a lockup clutch of a torque converter is disclosed in DE-C-31 30 871. This control unit consists inter alia of a fluid pressure control unit actuating the lockup clutch, a torque converter control valve, a magnetic valve, a pressure reducing valve unit controlled by a transmission operating mode detector, and an oil pump.

The fluid pressure control unit is responsible for the shift state of the lockup clutch, a valve spindle shifting the oil flow to the engaging or disengaging chamber of the lockup clutch. The torque converter control valve regulates the pressure of the oil that is supplied via the fluid pressure control unit to the lockup clutch, and consequently the slip acting on the lockup clutch.

Independently of this, the position of the plunger of the pressure reducing valve unit is determined by a transmission operating mode detector. The pressure reducing valve unit then controls the position of the valve spindle of the fluid pressure control unit, with a magnetic valve performing the fine adjustment of the valve spindle.

The use of the many different hydraulic shifting components, such as the fluid pressure control unit or the magnetic valve, renders the construction of the control unit very complicated and expensive.

In order to simplify the construction of the control device, control valves have been developed which perform several functions at the same time.

Thus, for example, DE-C-39 28 048 discloses a control device comprising a lockup clutch control valve, a main pressure regulating valve, a magnetic valve, and a "solenoid pressure limit valve". The lockup clutch control valve consists of an electromagnetic shifting component and a valve body with a control plunger slidably arranged therein which opens and closes various inlets and outlets. The control plunger has at its end remote from the electromagnetic shifting component a compression spring, which biases the control plunger towards the electromagnetic shifting component. At the end of the control valve facing the shifting component there is a control pressure chamber, which communicates via a control pressure outlet with the sump of the hydraulic transmission fluid supply and via a control pressure connection with a pump producing the control pressure. The control pressure is kept constant, for example, at 8 bar, by means of the "solenoid pressure limit valve" while the main pressure regulating valve furnishes the pressure acting in the lockup clutch. The magnetic valve generates an effective back pressure of about 1 bar, which acts to prevent the hydraulic transmission fluid flowing out of the converter, in order in this way to load the lockup clutch hydraulically.

By means of the electromagnetic shifting component, either the control pressure outlet can be connected to the sump or the control pressure connection to the control pressure chamber.

If the coupling device is to be opened, the control pressure connection is closed. The compression spring at the end of the control plunger remote from the shifting component pushes the control plunger into its starting position and forces the hydraulic transmission fluid present in the control pressure chamber through the control pressure outlet into the sump of the hydraulic transmission fluid supply. Through the position of the control plunger, the converter clutch back pressure outlet is connected to the supply pressure connection, to which a constant supply pressure is applied, while the converter clutch control pressure connection is connected to the hydraulic transmission fluid cooler. Because of the pressure difference, the coupling device opens.

If the electromagnetic shifting component opens the control pressure connection, it simultaneously closes the control pressure outlet to the sump. The control plunger is thereby displaced against the force of the compression spring, thus connecting the converter clutch control pressure connection to the control pressure connection, while the converter clutch back pressure outlet is connected via a further line to the control pressure outlet leading to the oil sump. The converter clutch is thereby closed.

The electromagnetic shifting component, a so-called pulse-width modulated magnetic valve, is operated at a shifting frequency of, for example, 40 Hz, while the duration of opening per applied control pulse, the so-called pulse width, can be varied. If the pulse width is 100%, the control pressure connection is open for the whole duration of the shifting pulse and the coupling device remains engaged. At a smaller pulse width, i.e., a shorter duration of opening of the control pressure connection, closure of the coupling device is incomplete, i.e., the coupling device slips. In this way, the slip between the turbine and the impeller can be purposefully influenced.

This arrangement has the disadvantage that the different connections have to be supplied with different pressures, which can only be realized through additional hydraulic components such as the solenoid pressure limit valve or the magnetic valve. Through the hydraulic loading, the lockup clutch can only be operated in a pressure range of 1 to 8 bar. A further disadvantage is that the control plunger is only biased by the spring, and at small pulse widths tends to flutter as a result of shifting.

SUMMARY OF THE INVENTION

Accordingly, it is an object of the invention to provide a control/regulating valve, the use of which significantly simplifies the construction of a control device for hydraulic torque converters of automatic transmissions for motor vehicles.

This object is achieved by means of a control member located in the control pressure chamber, of which the thinner end, remote from the shifting component, projects into the guide bore of the valve body, with a longitudinal bore in the control member connecting the control pressure chamber to a regulating pressure chamber formed by the control plunger and the control pressure chamber; and a pressure connection terminating in the end of the control pressure chamber remote from the shifting component.

It is advantageous if, in the shift/regulating valve, the first pressure connection is a control pressure connection; the second pressure connections include a supply pressure connection, which communicates via the first working chamber with a first converter clutch control pressure connection; the second pressure connections include a converter clutch supply pressure connection, which is connected via the second working chamber to a cooler outlet; the second pressure connections include a converter clutch back pressure outlet, which communicates via the third working chamber with a common pressure outlet; and the second pressure connections include a second converter clutch control pressure connection terminating in the fourth working chamber, since several connections can thereby be connected to one another at the same time, thus reducing the control outlay.

It is advantageous if the control/regulating valve has a back pressure chamber at the opposite end of the valve body to the control pressure chamber, with at least one supply line for the fluid medium, the fluid medium from the supply line (37), exerting a back pressure in the back pressure chamber.

It is also advantageous if the back pressure in the back pressure chamber is variable, since this allows pressure changes within the control pressure chamber to be followed.

Furthermore, it is advantageous if at least one ball shuttle valve is provided in the supply line of the back pressure chamber, in order to make forced shifting back to "unlock" possible.

It is advantageous if the shifting component is an electromagnetically controlled shifting component, such as a pulse-width modulated magnetic valve, since the effective pressure can be adjusted as a function of the duration of opening.

It is particularly advantageous if the shifting component is an electrohydraulically controlled shifting component, such as a variable force magnetic valve, since in the case of such valves, the pressure can be precisely adjusted by means of the applied electric potential.

It is advantageous if the fluid medium is a pressure medium, such as hydraulic transmission fluid, since hydraulic transmission fluid is, in general, incompressible, and at the same time has lubricating properties and is optimally adapted to the field of application.

By the use of the shift/regulating valve of the invention, the number of shifting components required can be significantly reduced, compared with the prior art. By the hydraulic loading of the control plunger, flutter of the control plunger at low pressures is excluded. When a variable force magnetic valve is used as shifting component, the throughflow of oil is very high, making rapid shifting of the converter lockup clutch possible. Finally, regulation of the lockup application pressure down to 0 bar can be realized, so that the lockup capacity is increased.

As soon as the shifting component opens the control pressure connection, the control pressure outlet leading to the sump of the hydraulic transmission fluid control system is closed. Pressure thereby builds up in the control pressure chamber and displaces the control member so far toward the end remote from the shifting component that the larger diameter section of the control member strikes the shoulder of the guide bore. The hydraulic transmission fluid in the control pressure chamber then flows onward through the longitudinal bore in the control member into the regulating pressure chamber and displaces the control plunger against the force of the resilient element located at the end of the control plunger remote from the shifting component. By way of the working chambers that are thus formed, the hydraulic transmission fluid can then flow from the supply pressure connection via the first converter clutch control pressure connection into the converter.

If the shifting component is shifted into the unlock position, the shifting component opens the control pressure outlet to the sump and, at the same time, closes the control pressure connection. The hydraulic transmission fluid present in the control pressure chamber thereby flows through the control pressure outlet into the sump of the hydraulic control system and the pressure in the control pressure chamber falls. As soon as the pressure acting in the control pressure chamber falls, the control plunger is displaced by the force of the prestressed resilient element and the pressure acting through the ball shuttle valve in the back pressure chamber, toward the end facing the shifting component, until the control plunger is up against the control member. In this shift state, the hydraulic transmission fluid in the converter housing can flow through the second converter clutch control pressure connection into the common pressure outlet.

If the pressure in the control pressure chamber falls further, the control plunger displaces the control member towards the end facing the shifting component and the converter clutch control pressure connection is connected to the cooler outlet.

The use of the control plunger in conjunction with the control member enables various shift states to be set. Within the lockup position, the shift/regulating valve can also be shifted in intermediate steps. This makes it possible for the same pressure to obtain at the control pressure connection and at the supply pressure connection, so that additional control members regulating the supply pressure, such as valves or throttles, are not required. The separation of control pressure and supply pressure makes high oil throughputs, and hence rapid pressure regulation, possible.

BRIEF DESCRIPTION OF THE DRAWINGS

The invention will now be described in more detail with reference to a preferred embodiment and to the accompanying diagrammatic drawings, without being in any way limited thereto, in which.

DETAILED DESCRIPTION OF A PREFERRED EMBODIMENT

Figure 1:
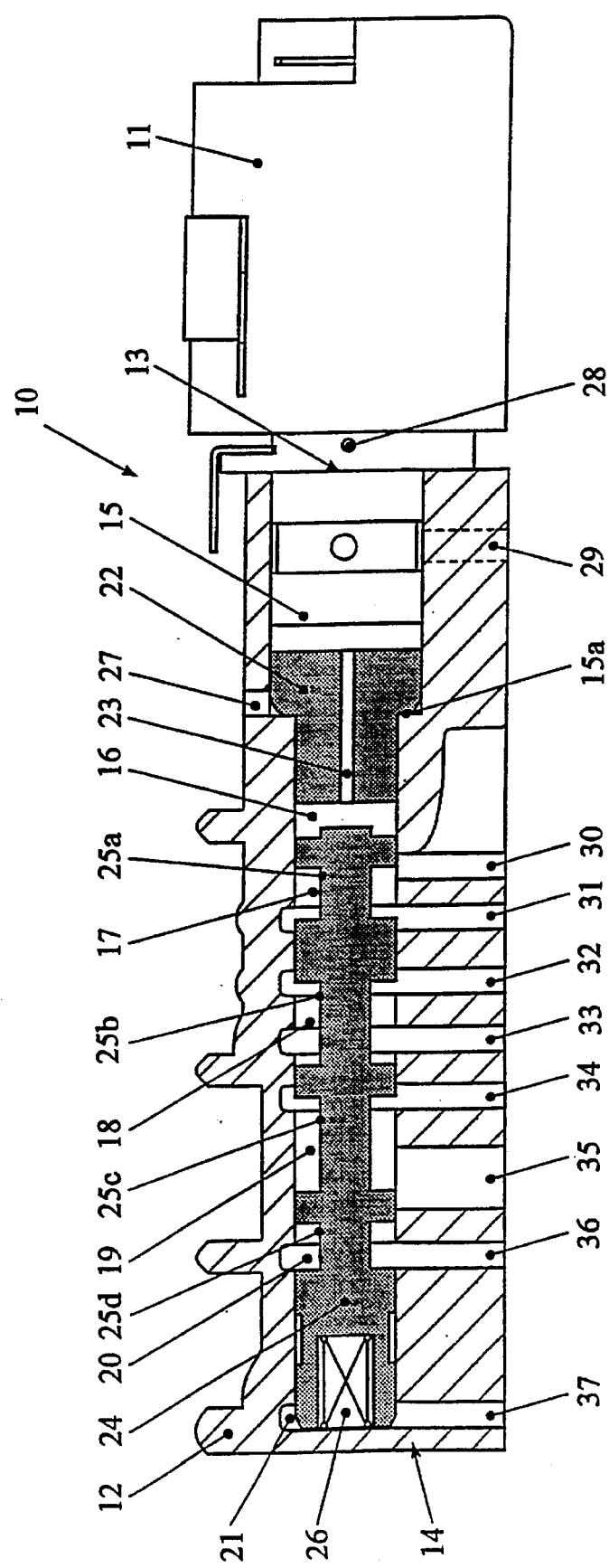
FIG. 1 is a longitudinal section through an embodiment of a shift/regulating valve in accordance with the invention, in the opened state.

A preferred embodiment of shift/regulating valve 10 according to the invention, as shown in FIG. 1, includes a shifting component 11 and a valve body 12. The shifting component 11 can be a pulse-width modulated magnetic valve or an electrohydraulic variable force magnetic valve. The valve body 12 has one end 13 facing the switch element and the other end 14 remote from the switching component. It has a control pressure chamber 15, to which is connected a guide bore, which extends toward the end 14 remote from the shifting component and has a shoulder 15a and a region of smaller diameter. The guide bore is divided by depressions located on the circumference of the bore into a regulating pressure chamber 16 next to the control pressure chamber 15, four further working chambers 17, 18, 19 and 20, and a back pressure chamber 21 which terminates the guide bore.

Bores 27, 28, 29, 30, 31, 32, 33, 34, 35, 36 and 37 in the valve body 12, extending substantially perpendicular to the control pressure chamber 15 and to the guide bore, serve as connections for various hydraulic transmission fluid lines.

A valve spool plunger 24, disposed longitudinally displaceably in the guide bore, has control grooves 25a, 25b, 25c and 25d. The control grooves can, according to whether the control/regulating valve 10 is "open" or "closed", connect the various outlets and connections 30, 31, 32, 33, 34, 35 and 36 to one another to form the working chambers 17, 18, 19 and 20.

In the control pressure chamber 15, a control member 22 having a section of relatively large diameter and a section of relatively small diameter is disposed with the smaller-diameter section of the control member 22 projecting into the guide bore. In addition, the control member 22 has at least one longitudinal bore 23 therein, which connects the control pressure chamber 15 to the regulating pressure chamber 16.

In a recess in the end of spool 24 remote from the shifting component, a resilient element 26, for example, a compression spring, is provided which is supported on the rear wall of the back pressure chamber 21 so that spool 24 can be displaced toward the end 13 facing the shifting component.

The back pressure chamber 21, at the end 14 remote from the shifting components is connected to a first back pressure connection 37. Through this first back pressure connection 37, there acts a back pressure which, particularly when reverse gear or first gear is engaged, holds the spool control plunger 24 in the unlock position so that the transfer of torque can only take place through the torque converter.

A second back pressure connection 27 terminates in the end of the control pressure chamber 15 near the shifting component. The pressure acting at the second back pressure connection 27 displaces the control member 22, against the pressure acting in the control pressure chamber 15, toward the end 13 facing the shifting component, so as to hold the control member 22 in the unlock position, particularly in first or reverse gear.

Likewise, acting through the back pressure connection 37, particularly in the lockup position, is the converter clutch control pressure, which serves as the actual pressure on the spool 24 and, together with the spring 26, acts against the intended pressure in the regulating pressure chamber FIGS. 2, 3, 4 and 5 show a known hydrodynamic torque converter 40 with a control/regulating valve 10 according to the invention. It is emphasized that the control/regulating valve 10 of the invention is not limited to use with this type of hydrodynamic torque converter 40. The torque converter 40 has a rotatably mounted impeller 41 and a turbine 42 rotatably mounted in the converter housing. A coupling device 43 makes possible a nonpositive connection of the impeller 41 to the turbine 42, so as, in the lockup position, to pass torque that has been transferred to the impeller 41 on to the turbine 42 without loss. Throttle bores 44 provide for a flow of hydraulic transmission fluid from the converter housing into the coupling device 43 and vice versa, thus closing the hydraulic transmission fluid circuit.

A cooler 46 constantly cools the hydraulic transmission fluid conveyed in the hydraulic control system, in order to avoid overheating of the hydraulic transmission fluid. A pump (not shown), which maintains the supply pressure necessary for the control system, conveys the hydraulic transmission fluid from an oil sump 48 via lines (not shown) to the individual components of the hydraulic control system.

Just before the torque converter 40, a line is provided, which branches off from the line of the converter clutch control pressure connection 31 and terminates in a ball shuttle valve 47, which is incorporated in the line 37 leading to the back pressure chamber 21.

Depending on which of the two lines 31 or 37 carries the higher pressure, the ball of the ball shuttle valve 47 closes the line with the lower pressure. In this way, different pressure states can be realized in the back pressure chamber 21, which states are only dependent on the shift state of the shift/regulating valve.

Figure 2:
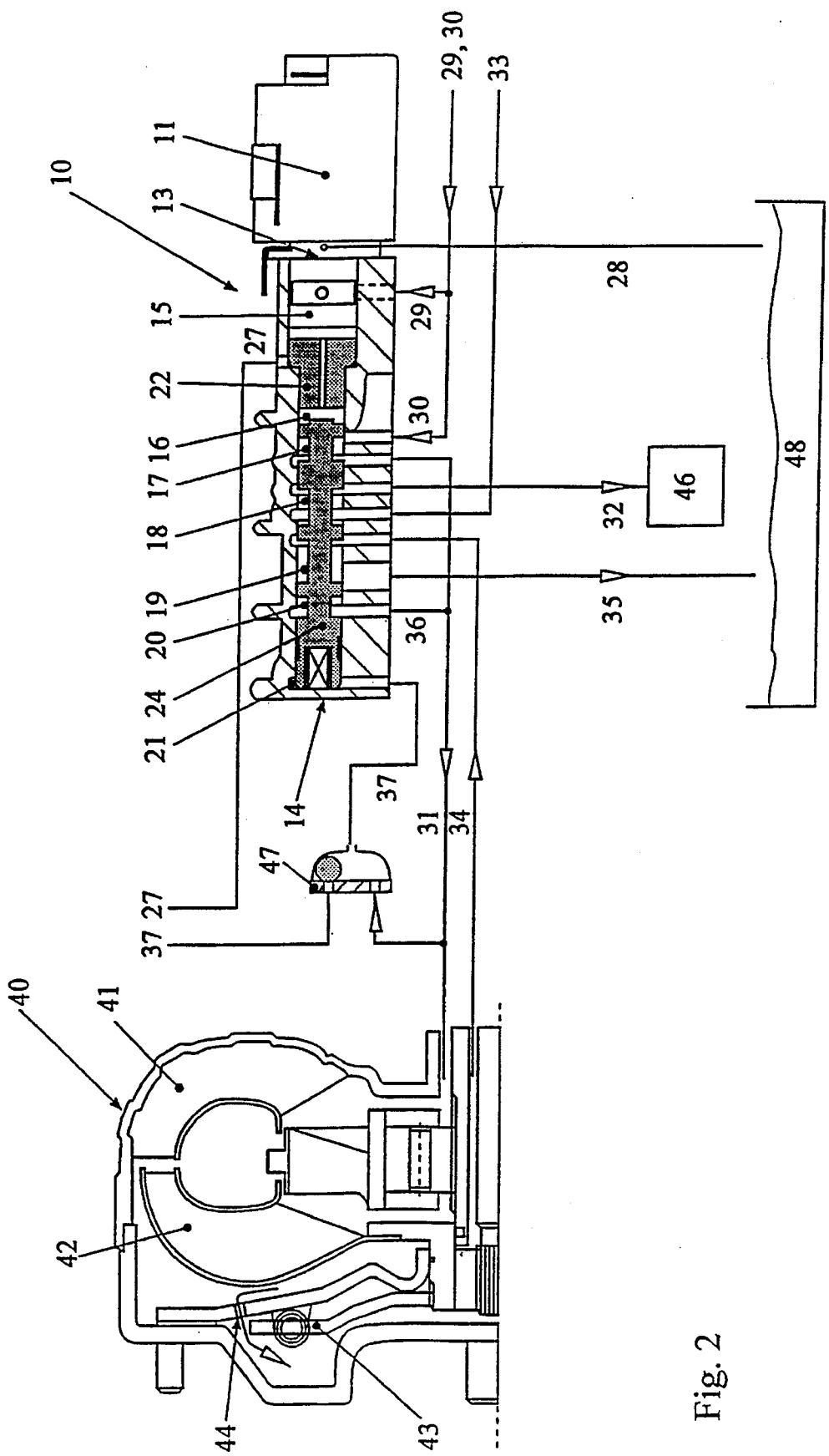
FIG. 2 is a drawing of the pressure control system of a hydrodynamic torque converter in the lockup position (increase in the converter clutch control pressure)

FIG. 2 shows the hydrodynamic torque converter 40 in the lockup position with the control/regulating valve 10 open. When the control/regulating valve 10 is open, the shifting component 11 closes the control pressure outlet 28 and, at the same time, opens the control pressure connection 29, to which a constant pressure (for example, 8 bar) is applied. Through the pressure of the hydraulic transmission fluid in the control pressure chamber 15, the control member 22 is accelerated toward the end 14 remote from the shifting component until the larger-diameter section of the control member 22 strikes the shoulder 15a of the guide bore. By this movement of the control member 22, the spool 24 is also displaced against the back pressure acting in the back pressure chamber 21 and against the force of the resilient element 26. The hydraulic transmission fluid present in the back pressure chamber 21 is forced back through the back pressure connection 37 into the oil passage system.

When the control member 22 is situated up against the stop, it holds the spool 24 in the lockup position. However, the spool can move axially to a slight extent, so that it can regulate the converter clutch control pressure 31. In FIG. 2, the case will now be described in which the converter clutch control pressure 21 is too low, i.e., it must be increased.

The intended pressure signal for the converter clutch control pressure 31 is generated by the shifting component 11, acts in the working chamber 15, and is transmitted through the longitudinal bore 23 in the control member into the regulating pressure chamber 16 where it exerts a force on the spool 24 directed toward the end remote from the shifting component. The actual pressure signal of the converter clutch control pressure 31 acts in the back pressure chamber 21, in conjunction with the spring 26, on the spool 24 and exerts a force directed toward the end facing the shifting component.

For the spool 24, the "law of equilibrium of forces" applies. If the converter clutch control pressure 31 is too low, the intended pressure in the working chamber 16 pushes the spool 24 toward the end remote from the shifting component.

In this way, the converter clutch control pressure 31 acting through the connection 36 is cut off by the spool 24 from the sump 35 and, at the same time, connected to the connection 30. Through this connection, pressurized hydraulic transmission fluid flows from the supply connection 30 through the working chamber 17 via the first converter clutch control pressure connection 31 into the housing of the torque converter 40, and also increases the pressure in the back pressure chamber 21. The forces acting on the spool are now in equilibrium.

At the same timed the converter clutch back pressure outlet 34 is connected via the working chamber 19 to the common pressure outlet 35, so that hydraulic transmission fluid can flow out from the coupling device 43 into the oil sump 48.

Through the high pressure acting via the first converter clutch control pressure connection 31, the coupling device 43 is preloaded against the pressure acting in the coupling device 43, so that a nonpositive connection is formed between the impeller 41 and the turbine 42 (lockup position).

In order to close the hydraulic transmission fluid circuit, throttle bores 44 (another possibility would be radial channels formed in the linings of the clutch plates) make it possible for hydraulic transmission fluid to flow in from the converter housing into the coupling device 43, and from there onward to the converter clutch back pressure connection 34.

Finally, the control groove 25b, by forming the working chamber 18, produces a connection between the converter clutch supply pressure connection and the cooler outlet 32, so that the hydraulic transmission fluid can flow via the working chamber 18 into the cooler 46.

Figure 5:
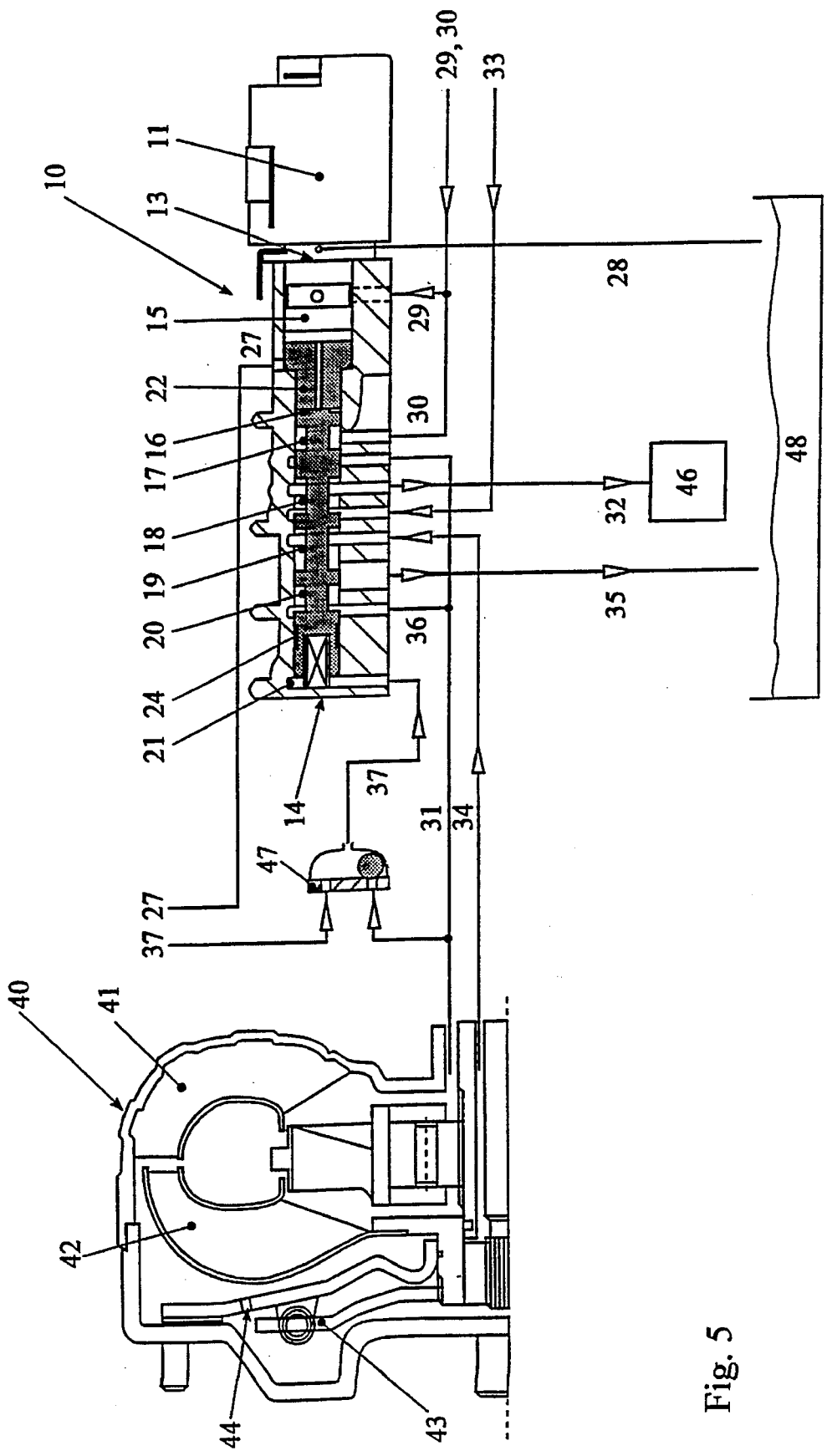
FIG. 5 is a drawing of the pressure control system of a hydrodynamic torque converter in the lockup position (reduction of the converter clutch control pressure).

In FIG. 5, the control/regulating valve 10 of the invention is shown shortly after the shifting of the shifting component from the lockup position into the unlock position, here in the case of low gears such as first gear or reverse gear, since in these gears transfer of the torque in the converter should, for improved driving comfort, only take place in the unlock position. The shifting component 11 opens the control pressure outlet 28 and at the same time closes the control pressure connection 29, so that the hydraulic transmission fluid flows out of the control pressure chamber 15 via the control pressure outlet 28 into the oil sump 48.

The pressure applied at the second back pressure connection 27 only in the case of reverse gear and first gear pushes the control member 22 toward the end facing the shifting component and up to the stop. The pressure, which likewise applies only in reverse gear and in first gear at the first back pressure connection 37, displaces the ball of the ball shuttle valve 47, closes the line to the converter clutch back pressure connection 31, and, via the line 37, reaches the back pressure chamber 21, where, in conjunction with the force of the resilient element 26, it also displaces the spool 24 towards the end 13 facing the shifting component as far as the stop.

The hydraulic transmission fluid still present in the regulating pressure chamber 16 is conveyed via the control pressure bore 23 into the control pressure chamber 15.

As soon as spool 24 is at this end position, the converter clutch back pressure outlet 34 is connected via the working chamber 19 to the converter clutch supply connection 33, and the converter clutch control pressure connection 31 is connected via the working chamber 18 to the cooler 46. In this way, the hydraulic transmission fluid in the housing of the torque converter 40 and the coupling device flows out and the coupling device begins to open.

Figure 4:
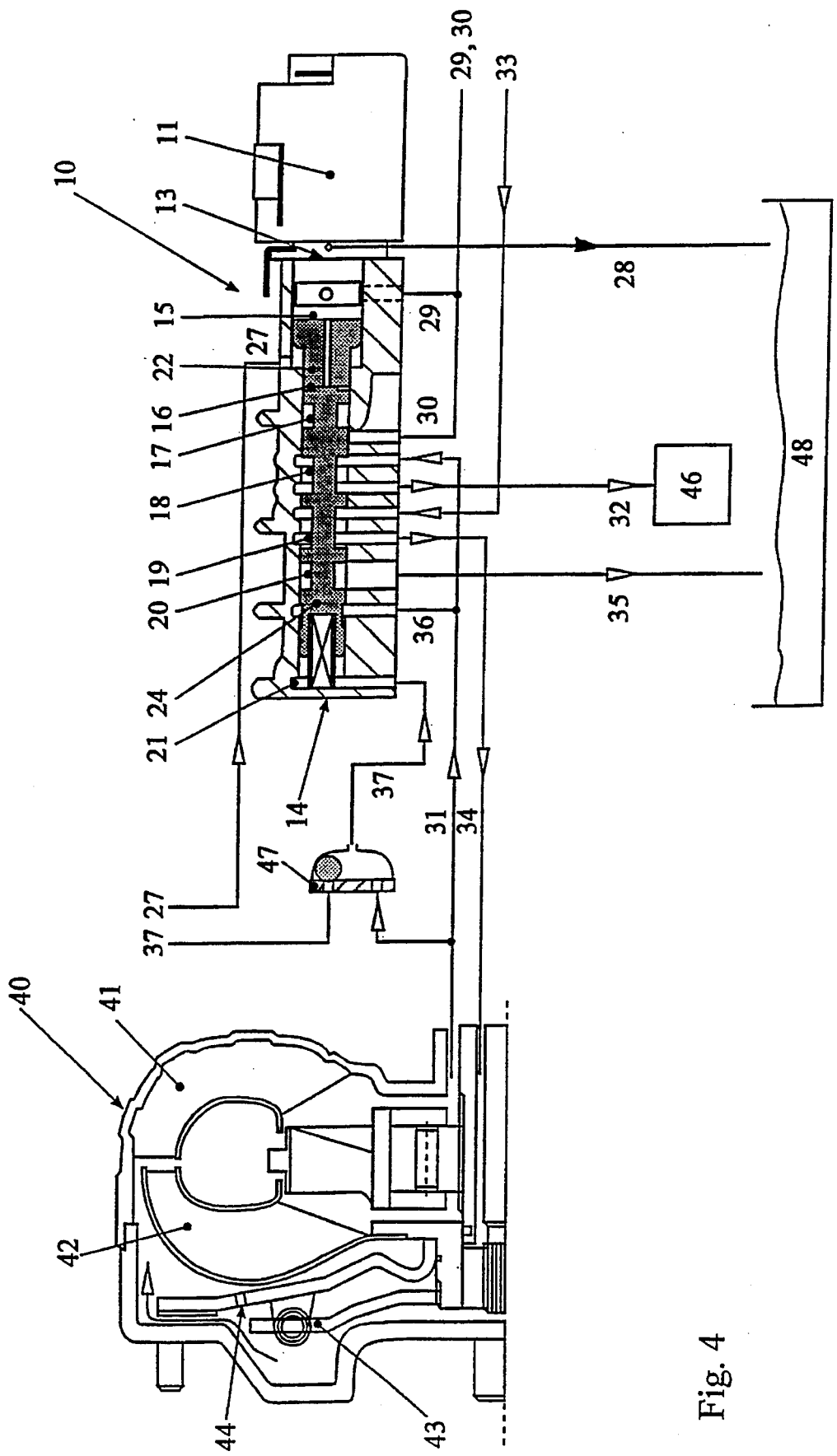
FIG. 4 is a drawing of the pressure control system of a hydrodynamic torque converter in the unlock position.

In FIG. 4, the pressure control system of a hydrodynamic torque converter is shown in the unlock position, in which the control/regulating valve 10 of the invention is closed. When the control/regulating valve 10 is closed, the shifting component 11 opens the control pressure outlet 28 and blocks the control pressure connection 29, so that the control plunger 24 and the control member 22 are displaced by the pressure acting in the back pressure chamber 21 and the resilient element 26 toward the end 13 facing the shifting component.

The supply pressure connection 30 is thereby closed by a control land on the control plunger 24.

If the spool 24 is closed, hydraulic transmission fluid can flow from the converter 40 through the first converter clutch control pressure connection 31 via the working chamber 18 formed by the second control groove 25b and the cooler outlet 32 into the cooler 46.

At the same timer the spool 24 makes possible a connection of the converter clutch supply pressure connection 33, which carries a pressure (for example, 6 bar) through the working chamber 19 to the converter clutch back pressure outlet 34. Pressure applied at the converter clutch back pressure outlet 34 opens the clutch, thereby deactivating coupling device 43 so that the nonpositive connection between the impeller 41 and the turbine 42 is broken. Since, in the line between the converter housing and the first converter clutch control pressure connection 31, the pressure is lower, the hydraulic transmission fluid flows from the converter clutch back pressure connection 34 via the coupling device 43 into the converter housing and from there onward via the first converter clutch control pressure connection 31 into the cooler (unlock position).

Figure 3:
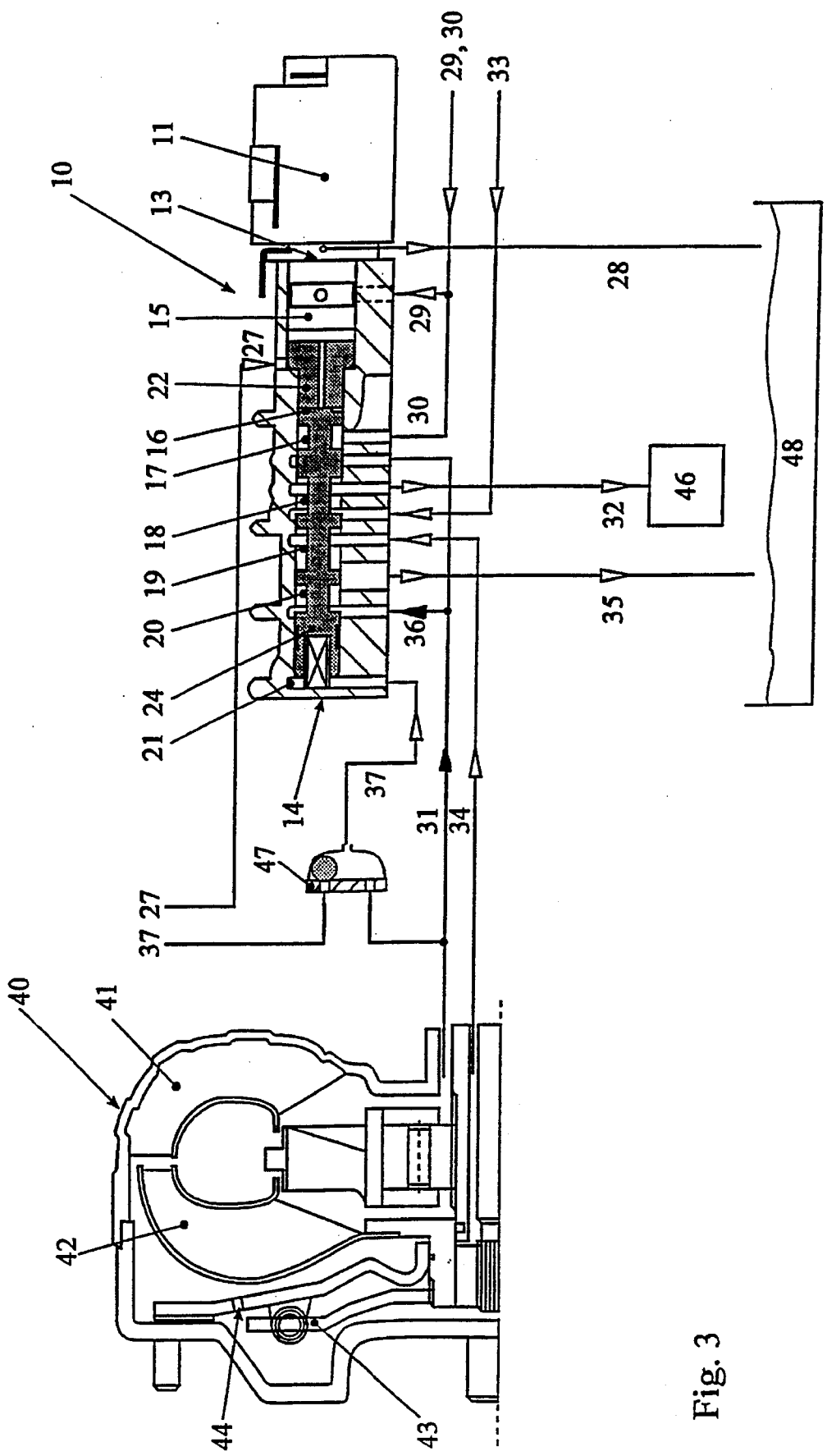
FIG. 3 is a drawing of the pressure control system of a hydrodynamic torque converter shortly before shifting from the lockup position to the unlock position.

In FIG. 3, the shift/regulating valve of the invention is shown, likewise in the lockup position.

The case shown in FIG. 3 will now be described, wherein the converter clutch control pressure 31 is too high and hence must be lowered. Since the converter clutch control pressure 31 is higher than the intended pressure in the working chamber 16, the spool 24 slides towards the end facing the shifting component. The converter clutch control pressure 31 is thereby cut off by the spool 24 from the supply pressure connection 30 and immediately connected via the connection 36 to the sump 35. Via this connection, hydraulic transmission fluid flows from the housing of the torque converter 40 into the sump, so that the pressure falls there as well as in the back pressure chamber 21. The converter clutch control pressure has thus followed the lower intended pressure, and the control plunger is "force equilibrated".

The shift/regulating valve 10 of the invention provides a very simple and elegant means of dispensing with many otherwise necessary control members such as valves or throttles. At the same time, undesired fluttering of the shift/regulating valve 10 in shift states around the unlock/lockup position is prevented, since the control plunger 24 is constantly hydraulically held between the pressures acting in the back pressure chamber 21 and the control pressure chamber 15 or the regulating pressure chamber 16.

In addition, the back pressure chamber 21 makes it possible to brake the spool 24 when the shifting component 11 is shifting, and thus reduces pressure shocks that might occur.

Although the invention has been described with reference to a preferred embodiment, those skilled in the art will at once see modifications and changes which likewise fall within the scope of the claims. This scope is therefore in no way restricted to the embodiment described.

What is claimed is:

1. A shift/regulating valve for controlling an hydrodynamic torque converter for an automatic transmission, comprising:

a shifting component;

a valve body defining a control pressure chamber for a fluid medium having an end facing the shifting component, an end remote from the shifting component, and a guide bore extending from the control pressure chamber to the end remote from the shifting component;

a spool disposed slidably in the guide bore and having at least one control groove thereon;

a control pressure outlet from the control pressure chamber;

a first pressure connection to the control pressure chamber;

a second pressure connection connecting at least one working chamber with at least one outlet;

a resilient element for biasing the spool toward the shifting component, wherein a second pressure connection is connected to an outlet through a control groove;

a control member located in the control pressure chamber, having a first end remote from the shifting component projecting into the guide bore, and a longitudinal bore connecting the control pressure chamber to a regulating pressure chamber bounded by the spool and the control member; and a pressure connection terminating in the end of the control pressure chamber remote from the shifting component.

2. The shift/regulating valve according to claim 1, further comprising:

a cooler outlet;

a first converter clutch control pressure connection;

the second pressure connection includes a supply pressure connection communicating via the first working chamber to the first converter clutch control pressure connection, a converter clutch supply pressure connection connected via a second working chamber to the cooler outlet, a converter clutch back pressure outlet communicating via a third working chamber with a outlet, a second converter clutch control pressure connection terminating in a fourth working chamber; and wherein the first pressure connection is a control pressure connection.

3. A shift/regulating valve according to claim 1, comprising a back pressure chamber located at the opposite end of the valve body to the control pressure chamber, having a supply line for the fluid a back pressure in the back pressure chamber.

4. A shift/regulating valve according to claim 3, further comprising a ball shuttle valve located in the supply line of the back pressure chamber.

5. A shift/regulating valve according to claim 1, comprising a back pressure chamber located at the opposite end of the valve body to the control pressure chamber, having a supply line for the fluid medium, the fluid medium from the supply line exerting a back pressure in the back pressure chamber.

6. A shift/regulating valve according to claim 5, further comprising a ball shuttle valve located in the supply line of the back pressure chamber.

7. The shift/regulating valve according to claim 1, wherein the shifting component is an electromagnetically controlled pulse-width modulated magnetic valve.

8. A shift/regulating valve according to claim 1, wherein the shifting component is an electrohydraulically controlled a variable force magnetic valve.

* * * * *